US008332408B1

(12) United States Patent
Rudary

(10) Patent No.: US 8,332,408 B1
(45) Date of Patent: Dec. 11, 2012

(54) DATE-BASED WEB PAGE ANNOTATION

(75) Inventor: Matthew R. Rudary, New York, NY (US)

(73) Assignee: Google Inc., Mountain View, CA (US)

( * ) Notice: Subject to any disclaimer, the term of this patent is extended or adjusted under 35 U.S.C. 154(b) by 201 days.

(21) Appl. No.: 12/861,279

(22) Filed: Aug. 23, 2010

(51) Int. Cl.
*G06F 17/30* (2006.01)
(52) U.S. Cl. ...................................... 707/737
(58) Field of Classification Search .................. None
See application file for complete search history.

(56) References Cited

U.S. PATENT DOCUMENTS

| | | | |
|---|---|---|---|
| 5,956,722 A | 9/1999 | Jacobson et al. | |
| 6,012,087 A | 1/2000 | Freivald et al. | |
| 6,349,296 B1 | 2/2002 | Broder et al. | |
| 6,434,573 B1 | 8/2002 | Jacobson et al. | |
| 6,547,829 B1 | 4/2003 | Meyerzon et al. | |
| 6,638,314 B1 | 10/2003 | Meyerzon et al. | |
| 6,877,137 B1* | 4/2005 | Rivette et al. ................. | 715/230 |
| 7,366,718 B1 | 4/2008 | Pugh et al. | |
| 7,409,383 B1* | 8/2008 | Tong et al. ............................. | 1/1 |
| 7,627,613 B1 | 12/2009 | Dulitz et al. | |
| 7,644,107 B2 | 1/2010 | Neagovici-Negoescu et al. | |
| 7,725,452 B1 | 5/2010 | Randall | |
| 7,818,312 B2 | 10/2010 | Broder et al. | |
| 8,001,462 B1 | 8/2011 | Kupke et al. | |
| 2002/0032772 A1 | 3/2002 | Olstad et al. | |
| 2003/0105744 A1 | 6/2003 | McKeeth | |
| 2005/0015394 A1 | 1/2005 | McKeeth | |
| 2005/0144193 A1 | 6/2005 | Henzinger | |
| 2005/0262089 A1 | 11/2005 | Wu | |
| 2006/0075345 A1* | 4/2006 | Sherman ....................... | 715/707 |
| 2006/0101005 A1* | 5/2006 | Yang et al. ......................... | 707/3 |
| 2006/0248063 A1 | 11/2006 | Gordon | |
| 2006/0294052 A1 | 12/2006 | Kulkarni et al. | |
| 2007/0078810 A1* | 4/2007 | Hackworth ........................ | 707/2 |
| 2007/0094254 A1 | 4/2007 | Cutts et al. | |
| 2007/0100817 A1 | 5/2007 | Acharya et al. | |
| 2007/0226206 A1 | 9/2007 | Pavlovski et al. | |
| 2008/0104256 A1 | 5/2008 | Olston | |
| 2010/0278453 A1* | 11/2010 | King .............................. | 382/321 |
| 2011/0078487 A1* | 3/2011 | Nielsen et al. .................... | 714/2 |
| 2012/0005686 A1* | 1/2012 | Rajan et al. ................... | 718/105 |

OTHER PUBLICATIONS

Non-Final Office Action for U.S. Appl. No. 13/209,593, mailed May 9, 2012, 19 pages.
Schleimer, et al, "Winnowing: Local Algorithms for Document Fingerprinting", SIGMOD, Jun. 9-12, 2003, 10 pages.

* cited by examiner

*Primary Examiner* — Bai D. Vu
(74) *Attorney, Agent, or Firm* — Brake Hughes Bellermann LLP

(57) ABSTRACT

Methods and apparatus for date annotating and displaying a web page. A web page is segmented into search data fragments. A date map is searched for matching target data fragments. Stop-words and punctuation symbols can be removed from the search and target data fragments, which can be arranged in alphanumerical order. A target data fragment matches a search data fragment when the edit distance between them is less than a threshold. The publication date of a search data fragment is the publication date of a matching target data fragment, otherwise, the current date. A search data fragment with no matching target data fragment is stored in the date map with the current date. Search data fragments are displayed using indicia to convey their publication dates. Indicia include search data fragment fonts or background colors on which search data fragments are displayed.

20 Claims, 7 Drawing Sheets

DATE-BASED WEB PAGE ANNOTATION

BACKGROUND

Today, a wealth of information is published in web pages on the world-wide-web. Often, metadata, or data about the information that is itself published in web pages, is just as important as the published information itself. For example, metadata that indicates when a web page or information in the web page was first published can be just as important as the information itself. Regrettably, it is often difficult to determine when information in a web page was first published on the world-wide-web since the content of web page can change over time and the history of that content change is generally not recorded in the web page. As a result, unless the author of a web page maintains and publishes all previous versions of the page, a reader cannot usually determine whether the information in the page was published at the same time or whether different parts of the page were published at different times. In addition, a reader cannot usually determine when a given part or section of a web page was first published in the web page.

Some efforts have been made to date web pages. For example, some wiki-based websites allow users to see differences between different versions of a web page published on the wiki-based website. However, these websites only allow two versions of a web page to be compared, and the information on either version may have first been published in a third and earlier version of the page. Moreover, these websites are generally limited to comparing different versions of web pages that are published on their own website. They do not allow a user to compare or contrast different versions of arbitrary pages on the world-wide-web. Other websites do attempt to catalogue and store different versions of arbitrary pages published on the world-wide-web, however, these websites generally do not provide a convenient mechanism for automatically determining the changes that have been made to a web page as a function of time, or for automatically determining when a particular part of a web page was first added to the web page. In short, none of the existing efforts to date web pages allow a user to systematically determine when different parts of an arbitrary web page were first published on the world-wide-web.

SUMMARY

In one aspect, methods and apparatus for date annotating a web page are disclosed. The method includes receiving a web page identified by a uniform resource identifier. The web page is then segmented into one or more search data fragments, including at least one search data fragment. A date map, previously generated from the contents of the web page, is searched for a target data fragment that matches the search data fragment. The date map includes one or more data fragments taken from the web page, where each data fragment is associated with a date indicating when the data fragment was first published on the web page. If the search data fragment does not match any target data fragment in the date map, the search data fragment is added to the date map, and is associated with the current date in the date map.

In another aspect, methods and apparatus for displaying a date annotated web page are disclosed. The method includes receiving a web page identified by a uniform resource identifier. The web page is then segmented into one or more search data fragments, including at least one search data fragment. A date map, previously generated from the contents of the web page, is searched for a target data fragment that matches the search data fragment. The date map includes one or more data fragments taken from the web page, where each data fragment is associated with a date indicating when the data fragment was first published on the web page. A publication date for the search data fragment is determined based on the results from the date map search. The search data fragment is displayed within the web page using indicia to convey its publication date.

Advantages of the disclosed methods and apparatus include one or more of the following. The search data fragment and the target data fragments can have one or more stop-words removed and can have one or more punctuation symbols removed. The terms in the search data fragment and the terms in the target data fragments can be stored in alpha-numerical order. A target data fragment in the date map can match the search data fragment when the edit distance between the target data fragment and the search data fragment is less than a threshold distance. If the search data fragment does not match any target data fragment in the date map, the publication date for the search data fragment based on the date map search is the current date. If the search data fragment matches a target data fragment in the date map, the publication date for the search data fragment based on the date map search is the date associated with the matching target data fragment. The indicia used to convey the publication date of the search data fragment can be the font of the search data fragment or the color of the background on which the search data fragment is displayed.

Further advantages of the disclosed methods and apparatus can include one or more of the following. An input signal conveying a search date can be received. The received input signal can be the position of a slider on a slider bar that is displayed in a graphical user interface. A search data fragment can be displayed within the web page using indicia to convey its publication date only when the search date matches the search data fragment's publication date. The search date can match the search data fragment's publication date when the search data fragment's publication date lies within a period that includes the search date.

DETAILED DESCRIPTION

In FIGS. 1A through 1D, a simple web page 100 is displayed in a web browser 110. The web page 100 consists of three sentences, each of which was added to the web page and published on the world-wide-web at different times.

Figure 1A:
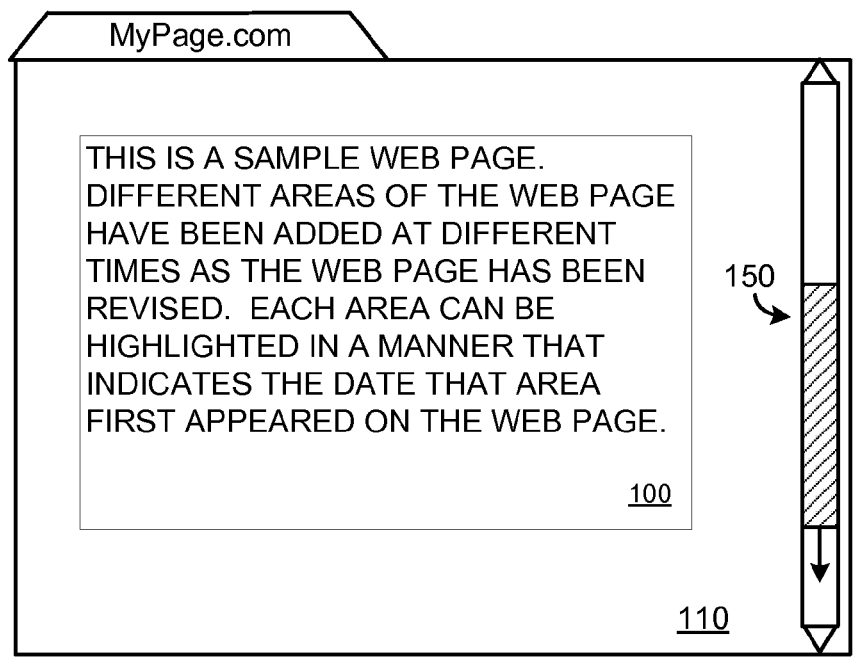
FIG. 1A is an illustration of a conventional web page display.

FIG. 1A is an illustration of a conventional method of displaying a web page. In FIG. 1A, web page 100 (e.g., MyPage.com) is conventionally displayed in web browser 110 in a manner that lacks any indicia, and does not convey any information indicating when different parts of the page were first published. By contrast, FIGS. 1B through 1D illustrate a method of displaying a web page that includes indicia or conveys information that indicates when different parts of the page were first published.

Figure 1B:
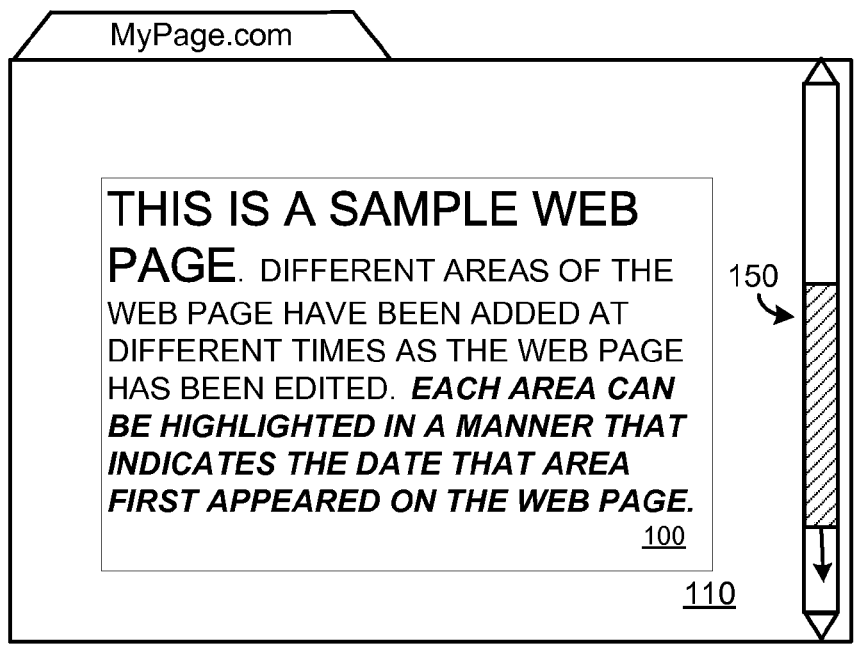
FIGS. 1B-1D are illustrations of a web page display that include indicia or information indicating when different parts of the page were first published.

In FIG. 1B, when web page 100 contains (or web browser 110 receives) information that indicates when different parts of web page 100 were first published, web page 100 is displayed in a manner that conveys that information. For example, the parts of web page 100 that were published at different times can be displayed in different fonts. Thus, as shown in FIG. 1B, since each sentence in web page 100 was added to the page at a different time, each sentence in web page 100 is displayed in a different font. Of course, different indicia can be used to convey the information that is available in web page 100 or that is made available to browser 110 to indicate when different parts of web page 100 were first published. For example, the parts of web page 100 that were published at different times can be displayed on different background colors rather than in different fonts. Thus, colors ranging from red-to-blue can be used to convey the different times at which different parts of web page 100 were first published, e.g., with the oldest published parts displayed over a red background and the newest published parts displayed over a blue background, or vice-versa.

Of course, other methods of conveying the metadata available in web page 100 or made available to web browser 110 that indicates when different parts of web page 100 were first published are possible. For example, as shown in FIGS. 1C and 1D, the web browser 110 can display a slider bar 130 with web page 100. The slider bar 130 can have a horizontal configuration as shown in FIGS. 1C and 1D, or a vertical configuration (not shown), or can be oriented at an arbitrary angle within the web browser display area. A slider 135, positioned within the slider bar 130, can be moved to an arbitrary position along the slider bar 130. The web browser 110 can interpret the position of slider 135 along the slider bar 130 to be a time between the first time any part of web page 100 was published and the last time any part of web page 100 was published. The web browser 110 can then use indicia such as font or background color to display those parts of web page 100 that were published at the time indicated by the slider bar 135 or within a certain range that is centered about that time (e.g., within 1 day, 1 week or 1 month).

Figure 1C:
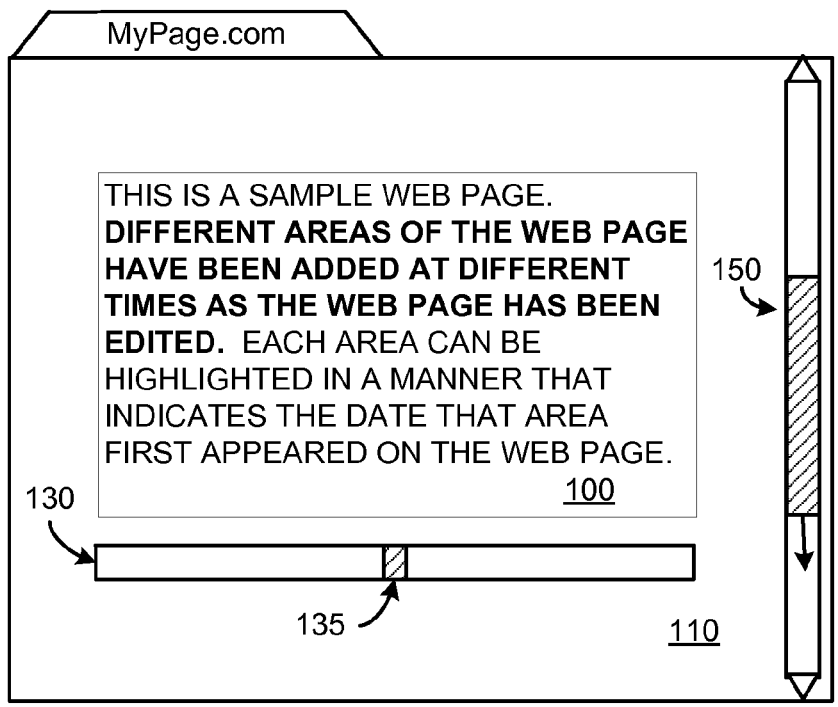
Figure 1D:
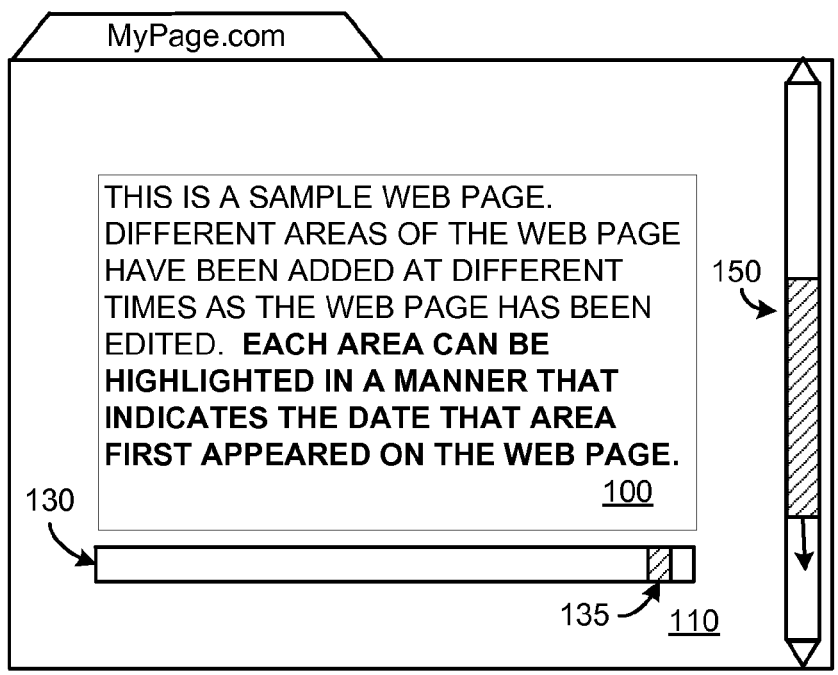

For example, when slider 135 is positioned mid-way along the slider bar 130 as shown in FIG. 1C, web-browser 110 can interpret the position of slider 135 to be a time halfway between the earliest time that any part of web page 100 was first published and the latest time that any part of web page 100 was first published. This time may, for example, be the time when the second sentence in web page 100 was first added to the page. As a result, web browser 110 can display the second sentence in web page 100 in a bold font, thereby indicating to a user that the second sentence of web page 100 was first added at or around the time corresponding to the position of slider 135 along slider bar 130. The web browser 110 can also display (not shown) the time that corresponds to the position of slider 135 along slider bar 135.

Similarly, when slider 135 is positioned further along the slider bar 130 as shown in FIG. 1D, web-browser 110 can interpret the position of slider 135 to be the latest time that any part of web page 100 was first published. This time may, for example, be the time when the third sentence in web page 100 was first added to the page. As a result, web-browser 110 can display the third sentence in web page 100 in a bold font, thereby indicated to a user that the third sentence of web page 100 was first added at or around the time corresponding to the position of slider 135 along slider bar 130. As before, the web browser 110 can also display (not shown) the time that corresponds to the position of slider 135 along slider bar 135.

Figure 2:
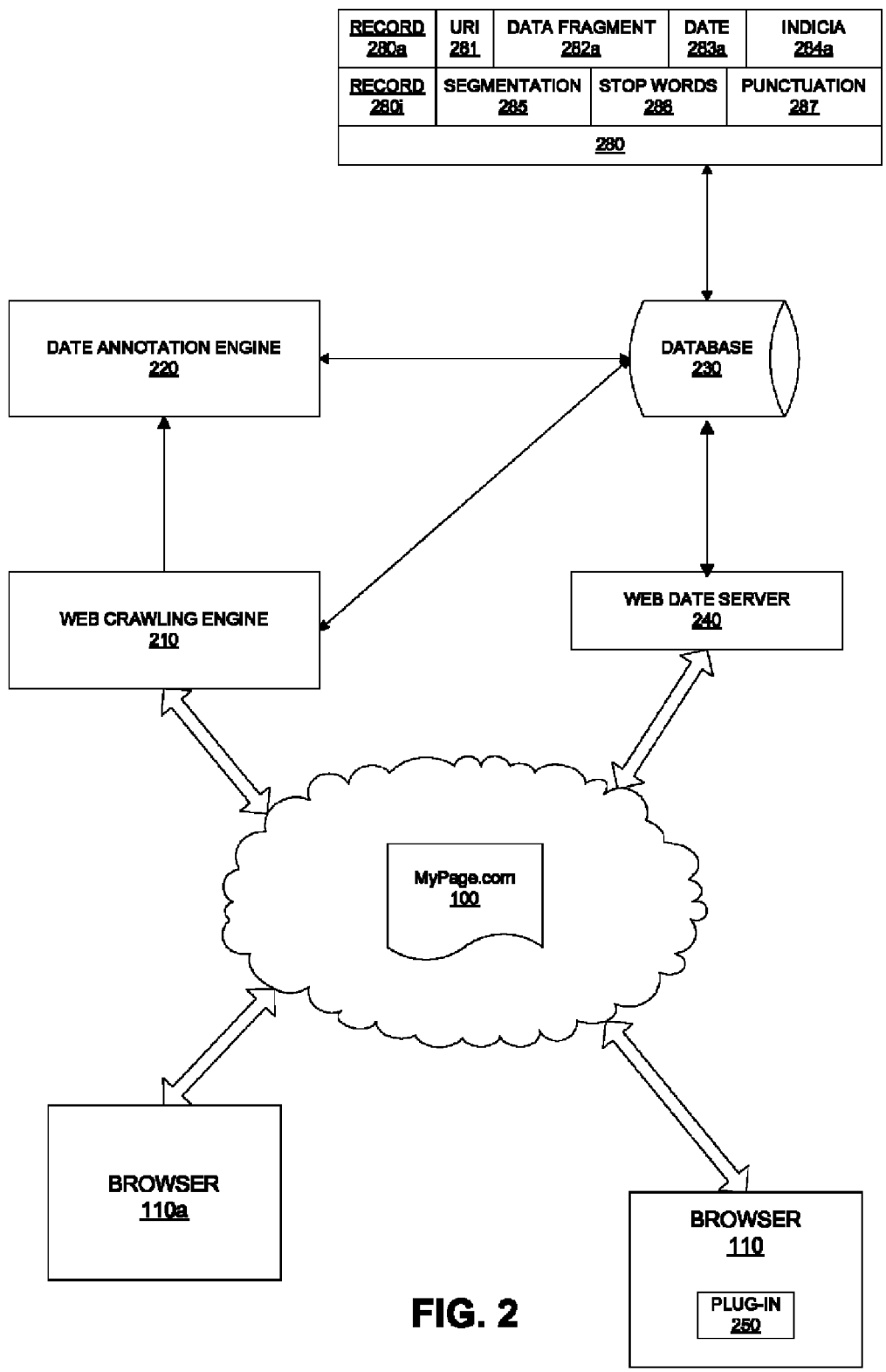
FIG. 2 is a schematic illustration of a system for collecting and disseminating information that indicates when different parts of a web page were first published.

FIG. 2 is a schematic illustration of a system for collecting and disseminating information indicating when different parts of a web page were first published on the world-wide-web. The system disclosed in FIG. 2 can be used, for example, to collect and disseminate the metadata that can be used to display web page 100 in the manner shown in FIGS. 1B through 1D, i.e., in a manner that indicates when different parts of the web page 100 were first added to the page.

The metadata collection portion of the system includes a web crawling engine 210, a date annotation engine 220 and a data repository, which can be a conventional relational database 230. When the web crawling engine 210 crawls a web page (e.g., web page 100 shown in FIGS. 1A through 1D), it stores the content of the web page in the database 230. It then alerts the date annotation engine 220, which can analyze the content of the web page to determine when different parts of the page were first published. Date annotation engine 220 can then store the results of that analysis in a date map 280 consisting of one or more records in database 230. In addition to storing the date map 280 in database 230, date annotation engine 220 can annotate the web page 100 with indicia to indicate when different parts of the web page were first published, and store the annotated web page in database 230.

As shown in FIG. 2, except for a special informational record 280i, each record in the date map 280 stored by date annotation engine 220 in database 230 can include the URI 281 (uniform resource identifier) of the analyzed web page, a data fragment 282a taken from the web page, and the date 283a the data fragment 282a was first identified by the date annotation engine 220. The date 283a can subsequently be used as a proxy to indicate when the data fragment 282a was first added to or published in the web page. Optionally, each record in the date map 280 can also include indicia 284a (e.g., font size or background color) specifying how the data fragment 282a should be displayed by a web browser based upon the date 283a the data fragment 282a was first added to the web page.

The metadata dissemination portion of the system includes the database 230, a web date server 240 and a web browser 110 or a web browser 110a. Web browser 110 includes a plug-in 250 that interacts with the web date server 240 to retrieve metadata such as the date map 280 indicating when different parts of a web page were first published, and uses that metadata to annotate and display the web page with indicia indicating when different parts of the page were first published. Alternatively, a conventional web browser 110a can retrieve an annotated web page directly from web date server 240. The web date server 240 can either retrieve the annotated web page directly from database 230 (e.g., retrieve a web page that has been annotated and stored by date annotation engine 220), or can use the metadata stored in the date map 280 to generate the annotated web page.

Figure 3:
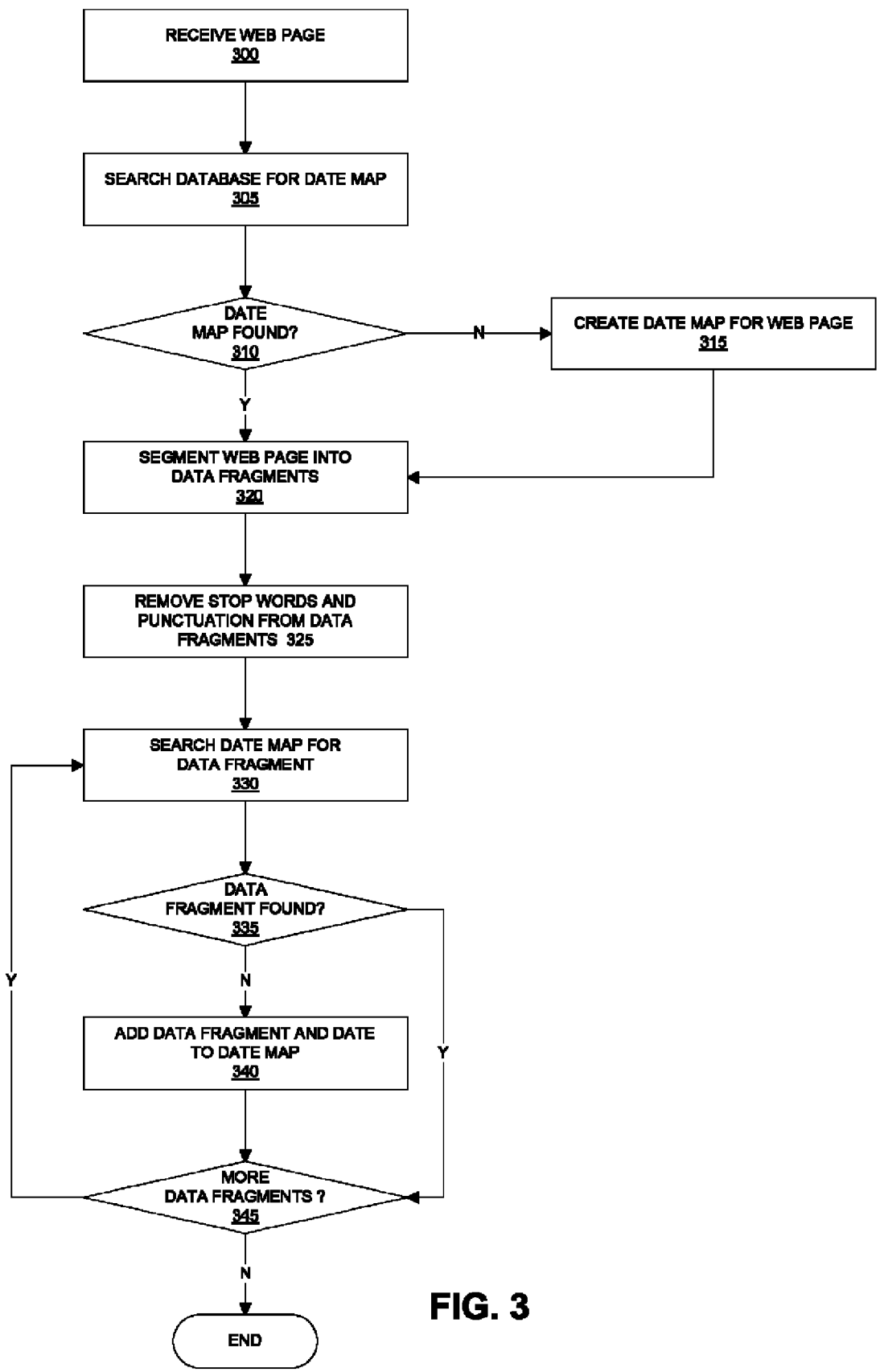
FIG. 3 is a flow chart illustrating a method for collecting and storing information indicating when different parts of a web page were first published.

FIG. 3 is a flow chart illustrating a method for collecting and storing information indicating when different parts of a web page were first published on the world-wide-web. The method can be executed, for example, by the date annotation engine 220 shown in FIG. 2. The date annotation engine 220 can begin by receiving a web page identified by a URI (300).

For example, the web page can be the web page 100 shown in FIGS. 1A through 1D, and can be received from the web crawling engine 210 shown in FIG. 2. Once the web page is received, the date annotation engine 220 can search a data repository (e.g., database 230 shown in FIG. 2) for a date map that indicates when different parts of the web page were first added to the page (305). The date map can be, for example, the date map 280 shown in FIG. 2, and can consist of one or more database records 280a that identify the web page 100 by its URI 281 and that indicate the date 283a that a particular data fragment 282a was first added to the web page 100. If no such date map 280 exists for the web page 100, the date annotation engine 220 creates one (315).

Thereafter, the date annotation engine 220 can segment the web page into a plurality of data fragments (320). As used herein, a data fragment is the smallest part of a web page that is analyzed to determine when that part was first added to the web page. The date annotation engine 220 can segment the web page into data fragments at different levels of granularity. For example, the date annotation engine 220 can segment the web page into data fragments consisting of chapters, sections, paragraphs, sentences, phrases, n-words (i.e., n adjacent words), words, or letters of the web page, or into any other unit into which the web page can be divided. Of course, the more finely the date annotation engine 220 segments the web page (i.e., the smaller the size of the data fragments), the more resources will be needed to determine, store and display the data that indicates when those data fragments were first added to the web page. The date annotation engine 220 can record the granularity of the data segmentation in a special informational record in the date map. For example, as shown in FIG. 2, the date annotation engine 220 can store the level of segmentation 285 in a special information record 280i in the web page's date map 280.

After segmenting the web page into data fragments, the date annotation engine 220 can identify and remove any punctuation and any so-called "stop-words" from the data fragments (325). As used herein, "stop-words" are words, like articles or prepositions, that while a part of the web page convey very little information and add very little meaning to the web page. Stop-words can include words such as "a", "the", "of", "if", "such", and the like. While lists of stop-words can be found on the world-wide-web and elsewhere, there is no universally agreed upon list of stop-words, and any conventional or reasonable list of stop-words can be used in the method described herein. Alternatively, the date annotation engine 220 can be configured so that it does not remove any stop-words and/or any punctuation symbols from the web page. Of course, if the date annotation engine 220 does not remove any stop-words or punctuation symbols, more resources will be required to determine, store and display the data that is used to indicate when different parts of the web page were first added to the web page. When the date annotation engine 220 removes stop-words or punctuation from the data fragments, it can record the list of stop words or punctuation it removed in the date map's special informational record. For example, as shown in FIG. 2, the date annotation engine 220 can record the list of stop words 286 and the list of punctuation symbols 287 removed from the web page in the special information record 280i in the date map 280.

After removing any stop words or punctuation from the data fragments (325), the date annotation engine 220 processes each of the data fragments in a sequence (330-345), until all of the data fragments have been processed. For each data fragment taken from the web page, the date annotation engine 220 can search the web page's date map for that data fragment (330). For example, as shown in FIG. 2, the date annotation engine 220 can search for each data fragment in all the records in database 230 that contain the web page's URI 281. If the date annotation engine 220 finds the current data fragment in the web page's date map (335), it processes the next data fragment in the web page, if one exists (345). If, however, the date annotation engine 220 fails to find the current data fragment in the web page's date map (335), it creates a new database record that contains the data fragment, the current date, and the URI of the web page, and it adds the new database record to the web page's date map (340). In addition, the date annotation engine 220 can also include indicia (e.g., font type or background color) in the new database record that indicates how the data fragment should be displayed when the web page is rendered by a web browser. When all of the data fragments in the web page have been so analyzed (345), the process run by date annotation engine 220 ends.

Figure 4:
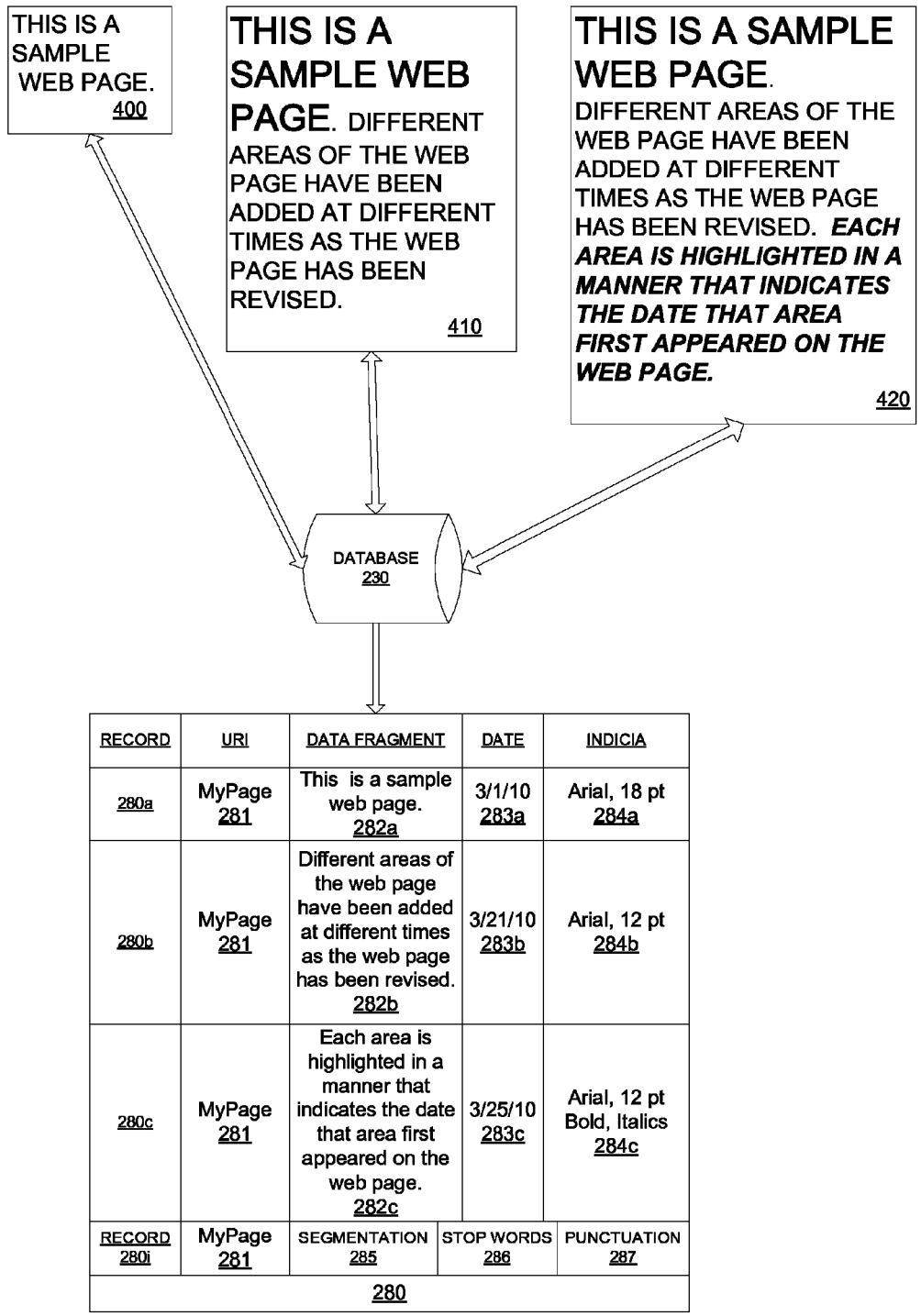
FIG. 4 is a schematic illustration showing the information collected for different parts of a web page published at different times on the world-wide-web.

FIG. 4 is a schematic illustration showing the information collected for different parts of a web page published at different times on the world-wide-web. As shown in FIG. 4, three different versions of a web page having a URI 281 (e.g., MyPage.com) are published at three different times. A first version 400, which consists of a single sentence 282a can be published, for example, on Mar. 1, 2010. A second version 410, which adds a second sentence 282b to the web page can be published, for example, on Mar. 21, 2010. And a third version 420, which adds a third sentence 282c can be published, for example, on Mar. 25, 2010. The content of the web page having URI 281, including the metadata indicating when different parts of the web page were first published on the world-wide-web, can be collected and stored in a date map 280 for the web page. The date map 280 can consist of a plurality of database records 280a-c and a special informational database record 280i. The informational database record 280i identifies the URI 281 of the web page, the list of stop words 286 and punctuation 287 removed from the web page, and the segmentation 285 used to generate data fragments from the web page. Each of the remaining database records, for example record 280c, identifies the URI 281 of the web page, a data fragment 282c taken from the web page, the date 283c the data fragment 282c was first identified, and optionally indicia 284c indicating how the data fragment 282c should be displayed when the web page is rendered. This information can be collected and stored, for example, by the date annotation engine 220 shown in FIG. 2 using the method described above in FIG. 3.

As explained above, when the date annotation engine 220 receives a web page having a URI 281, it searches a database 230 for a date map 280 for that web page. If no such date map exists, the date annotation engine 220 creates it. Next, the date annotation engine 220 segments the web page into one or more data fragments at a given level of granularity. For example, the date annotation engine 220 can segment the web page into data fragments consisting of a single sentence. As shown in FIG. 4, if the first version 400 of the web page consists of a single sentence, and the date annotation engine is configured to segment the web page into sentence wide data fragments, the date annotation engine 220 will create a date map 280 consisting of a special information record 280i and a single data fragment record 280a, both of which include the web page's URI 281. The data fragment record 280a also include a single data fragment 282a (consisting of the first and only sentence in version 400 of the web page), the publication date 283a of the data fragment 282a, and optionally the indicia 284*a* that can be displayed to convey the publication date 283*a* of the data fragment 282*a* when the web page is rendered.

If the web page having a URI 281 is crawled daily by the web crawling engine 210, it will be annotated daily by the date annotation engine 220. However, while the content of the web page remains unchanged, the content of the date map for the web page will also remain unchanged. It is only when the content of the web page changes, such as when a second sentence is added to the web page to create a second version 410, that the date annotation engine 220 will discover the content change and update the web page's date map. For example, as shown in FIG. 4, when version 410 of the web page is first crawled and analyzed, the date annotation engine 220 will segment the web page into two data fragments 282*a* and 282*b*, each of which is a single sentence long. Next, the date annotation engine 220 will discover that data fragment 282*a* is already stored in a date map 280 for the web page, but that data fragment 282*b* is not. The date annotation engine 220 will therefore create a new data fragment record 280*b* that includes the web page's URI 281, a single data fragment 282*b* (consisting of the second and last sentence in version 410 of the web page), the publication date 283*b* of the data fragment 282*b*, and optionally the indicia 284*b* that can be displayed to convey the publication date 283*b* of the data fragment 282*b* when the web page is rendered. Similarly, when a third version 420 of the web page is first crawled and analyzed, the date annotation engine 220 will segment the third version 420 of the web page into three data fragments 282*a* through 282*c* (each consisting of a single sentence), and will search for and discover that data fragments 282*a* and 282*b* are already stored in the date map 280, but that data fragment 282*c* is not. The date annotation engine 220 will therefore create a new data fragment record 280*c* that includes the web page's URI 281, a single data fragment 282*c* (consisting of the third and last sentence in version 420 of the web page), the publication date 283*c* of the data fragment 282*c*, and optionally the indicia 284*c* that can be displayed to convey the publication date 283*c* of the data fragment 282*c* when the web page is rendered.

Figure 5:
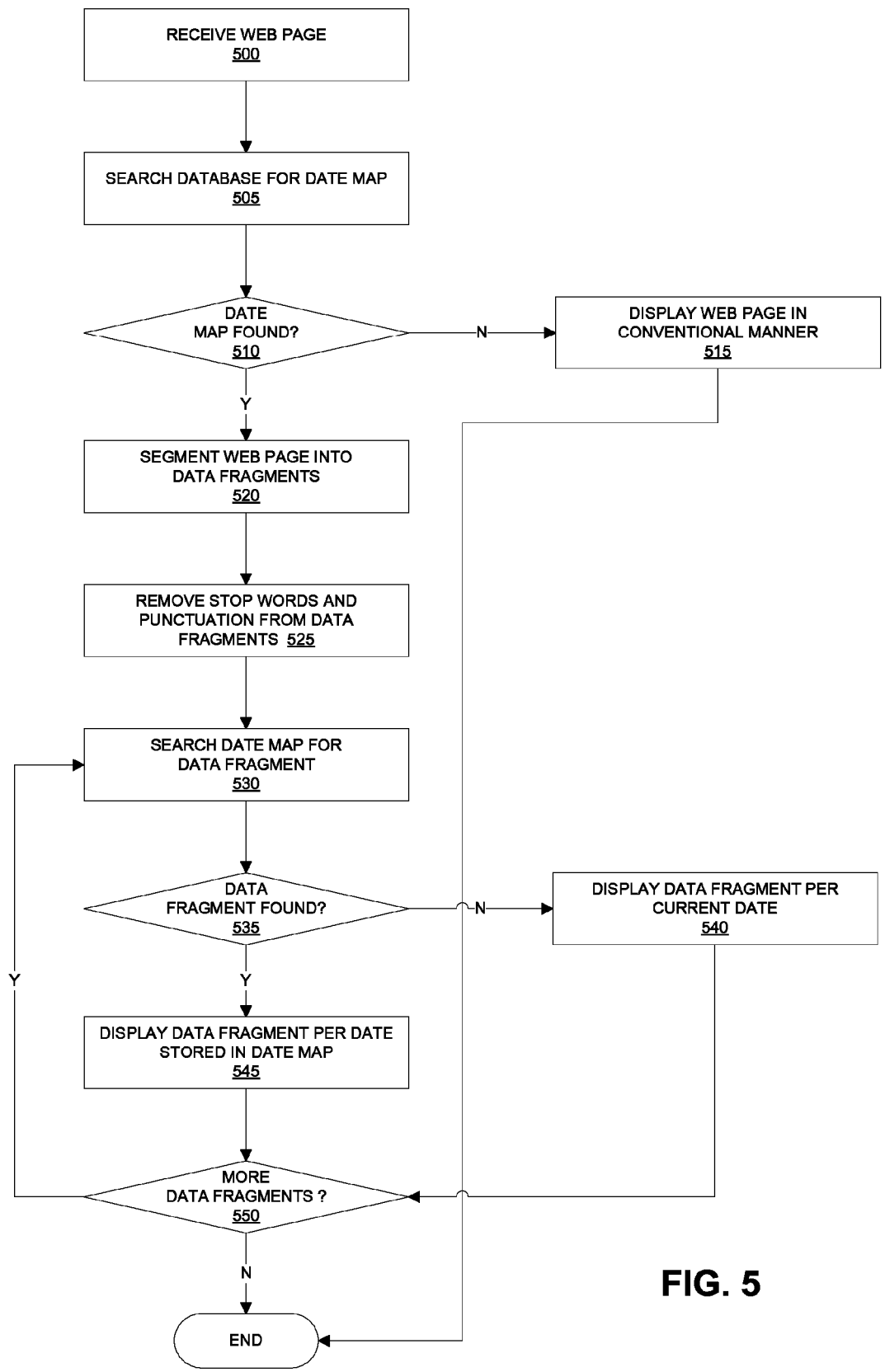
FIG. 5 is a flow chart illustrating a method for displaying a web page in a manner that illustrates when different parts of the web page were first published.

FIG. 5 is a flow chart illustrating a method for displaying a web page in a manner that illustrates when different parts of the web page were first published. The method can be executed, for example, by the web browser 110 shown in FIG. 2. The web browser 110 can include a plug-in 250 that allows it to access the contents of database 230 through a web date server 240. The web browser 110 can begin by receiving a web page identified by a URI (500). For example, the web page can be the web page 100 shown in FIGS. 1A through 1D. Once the web page is received, the web browser 110 can search a database for a date map that indicates when different parts of the web page were first added to the page (505). For example, as shown in FIG. 2, the web-browser can search a database 230 (via a web date server 240) for a date map 280 whose records contain the URI 281 of the web page. The date map 280 can include a special informational record 280*i* and one or more data fragment records 280*a*, each of which identify the web page by its URI 281. If the browser 110 does not find a date map for the web page 100, the browser 110 can display the web page 100 in a conventional manner (515). For example, the web browser 110 can display the web page 100 in the manner shown in FIG. 1A, which lacks any indicia or information indicating when different parts of the web page 100 were first published.

If, however, the web browser 110 finds a date map for the web page 100 in the database 230, the web browser 110 segments the web page 100 into a plurality of data fragments at the same level of granularity as the level used to generate the web page's date map (520). This can be done, for example, by retrieving from the web page's date map the level of segmentation that was used to create the date map. For example, as shown in FIG. 2, the web browser 110 can read the special informational record 280*i* of the web page's date map 280 to determine the segmentation 285 that was used to generate the date map. The web browser 110 can then segment the received web page at the same level of segmentation.

Next, the web browser 110 can identify and remove any punctuation and any so-called "stop-words" from the data segments (525) in the same manner that stop-words and punctuation were removed from the data segments when the web page's date map was created. This can be done, for example, by retrieving from the web page's date map the list of stop-words and the list of punctuation that was removed (if any) from the data segments when the web page's date map was created. For example, as shown in FIG. 2, the web browser 110 can read the special informational record 280*i* of the date map 280 to determine the list of stop-words 286 and punctuation 287 that were removed from the data fragments (if any) when the web page's date map was created. Once the web browser 110 removes the stop words and punctuation (if any) from the data fragments, it processes each of the data fragments in a sequence (530-550), until all of the data fragments have been processed.

For each data fragment, the web browser 110 searches the web page's date map for the data fragment (530). If the web browser 110 does not find the data fragment in the date map (535), it displays the data fragment in a manner that indicates the data fragment's publication date is the current date (540). If, however, the web browser 110 finds the data fragment in the date map (535), it retrieves the publication date from the date map, and displays the data fragment in a manner that indicates that publication date (545). This can be done, for example, by displaying the web page in the manner depicted in any of FIGS. 1B through 1D. In each of FIGS. 1B through 1D, the web browser 110 can choose the indicia (e.g., font size or background color) that indicates the publication date of a given data fragment. Alternatively, if the web page's date map includes indicia specifying how particular data fragments should be displayed, the web browser 110 can display those data fragments according to those indicia. When all of the web page's data fragments have been displayed (550), the web browser 110 rendering process ends.

Figure 6:
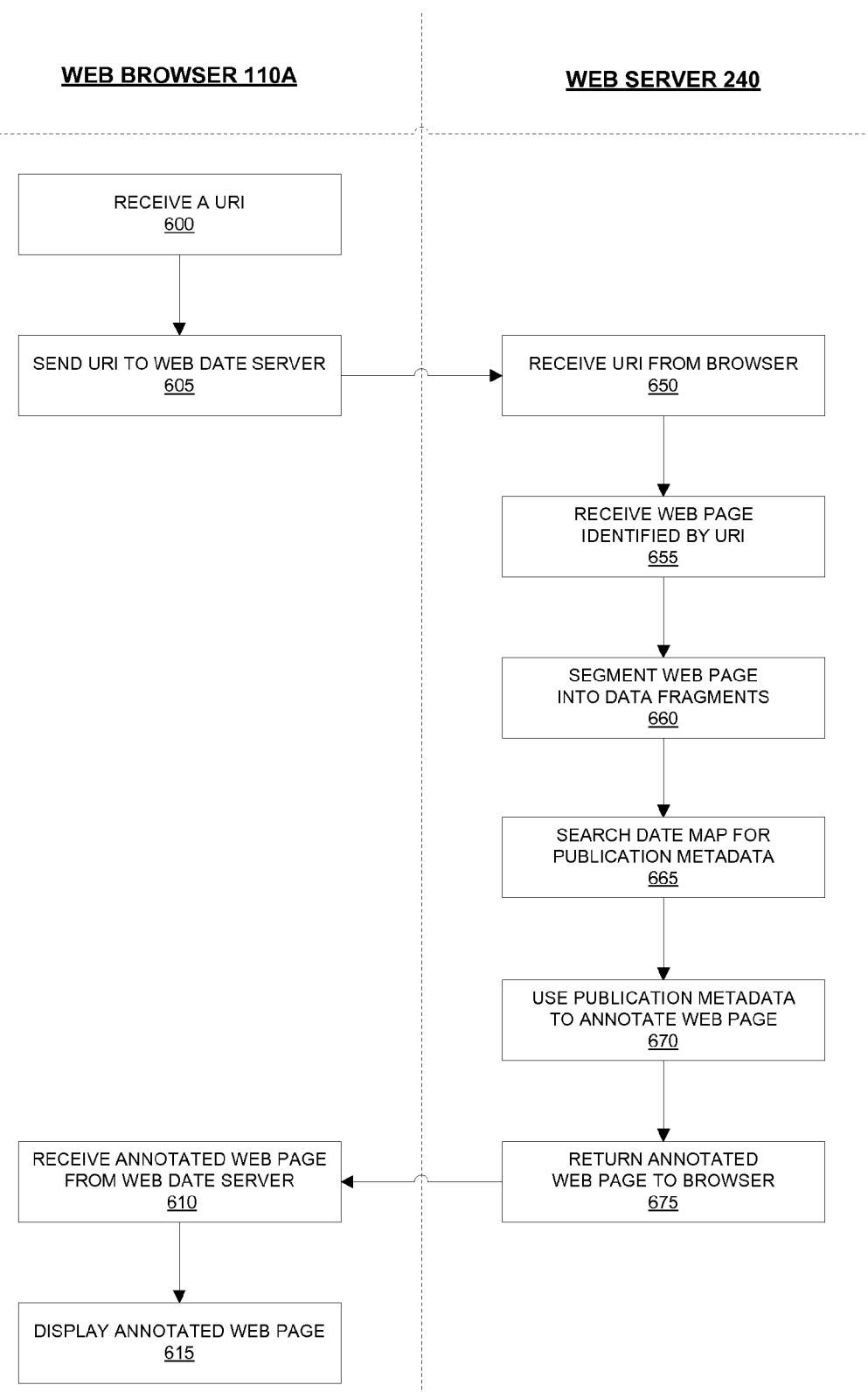
FIG. 6 is a flow chart illustrating an alternate method for displaying a web page in a manner that illustrates when different parts of the web page were first published.

FIG. 6 is flow chart illustrating an alternate method for displaying a web page in a manner that illustrates when different parts of the web page were first published. The method can be executed, for example, by the convention web browser 110*a* interacting with the web date server 240 shown in FIG. 2. As shown in FIG. 6, the web browser 110*a* receives the URI for a web page (600), and sends the URI to the web date server 240 (605).

In one embodiment, the web date server 240 receives the URI from the web browser 110*a* (650), then requests and receives the web page from the website identified by the URI (655). Once the web page is received, the web date server 240 can use a modified version of the method disclosed in FIG. 5 to annotate the web page with indicia indicating when different parts of the web page were first published. In particular, the web date server 240 can segment the web page into data fragments (660), search a database for a date map that contains metadata indicating when the different data fragments were first published on the web page (665), and annotate the web page with indicia indicating when the different fragments were first published using the publication metadata (670). It is to be noted herein that whereas FIG. 5 discloses displaying the web page in a conventional manner when no date map is found for the web page (515), the web date server 240 would instead not annotate any of the data fragments in the received web page. Similarly, whereas FIG. 5 discloses displaying a data fragment per the current date (540) or the date stored in the date map (545), the web date server 240 would instead annotate the web page with indicia indicating the data fragment was first published on the current date or the date stored in the date map. Once the web date server 240 has annotated the web page (670), it returns the annotated web page to the browser 110a (675). The browser 110a receives the annotated web page from the web date server 240 (610), and displays it (615). For example, the browser 110a can display the annotated web page in the manner shown in FIGS. 1A through 1D.

In another embodiment (not shown), when the web data server 240 receives the URI of the web page from the web browser 110a, rather than retrieving the web page from the website identified by the URI, the web data server 240 searches for a date annotated version of that web page a in data repository such as the database 230 shown in FIG. 2. A date annotated version of the web page could have been created and stored in the database, for example, by the date annotation engine 220 as described above. If the web data server 240 finds a date annotated version of the web page in the data repository, it retrieves the date annotated version from the database and sends it the web browser 110a, where it is displayed. If, however, the web data server 240 does not find a data annotated version of the web page in the data repository, it returns an error message to the web server 110a, which then displays the web page without annotation.

While the invention has been described with respect to the methods and apparatus disclosed in FIGS. 1 through 6 above, variations in these methods and apparatus are possible and within the scope of the invention. For example, in FIGS. 3 and 5 above, a web page's data map is searched to determine whether the date map contains a target data fragment that "matches" a query data fragment. The degree of matching required can, of course, be variable. For example, the degree of matching can be exact, in which case the target data fragment will only "match" the query data fragment if the two data fragments are identical. Alternatively, the degree of matching can be less than exact, in which case the target data fragment will "match" the query data fragment if the edit distance between the two data fragments is less than a threshold distance. As is well known in information theory, the edit distance between two strings is the number of operations required to transform one string into the other. Thus, the smaller the edit distance between two strings, the closer the strings "match" one another. Various algorithms for determining and computing the edit distance between strings are known to those of skill in the art, including the Hamming distance and the Levenshtein distance, and can be used to determine whether a query data fragment taken from a recently received version of a web page "matches" a target data fragment recorded in the web page's date map. Allowing less than exact matching between the query data fragment and the target data fragment reduces the sensitivity of the disclosed method and apparatus to minor changes to the content of a web page. Thus, only significant changes to the web page will be detected and recorded, where the degree of significance is measured by the size of the threshold distance. The larger the threshold distance, the bigger or more significant the changes to the web page must be before they are recorded.

Similarly, in some implementations, especially where the web page is segmented into data fragments consisting of sentences, phrases, or n words, it is possible to ignore the ordering of the words within the data fragments when determining whether a query data fragment "matches" a target data fragment. In these implementations, the words in the data fragments can be sorted in alphabetical or alphanumerical order when they are created, and stored in that order to make the comparison between the query and target data fragments easier. Disregarding the ordering of words within data fragments also reduces the sensitivity of the disclosed method and apparatus to minor changes to the content of a web page.

Implementations of the various techniques described herein may be implemented in digital electronic circuitry, or in computer hardware, firmware, software, or in combinations of them. Implementations may implemented as a computer program product, i.e., as a computer program tangibly embodied in a machine-readable storage medium for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communications network.

Method steps may be performed by one or more programmable processors executing a computer program to perform functions by operating on input data and generating output. Method steps also may be performed by special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer may also include, or be operatively coupled to receive data from and/or transfer data to, one or more mass storage devices, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry such as an FPGA (field programmable gate array) or an ASIC (application-specific integrated circuit).

To provide for user interaction, the disclosed methods or apparatus may be implemented on a computer having a display device for displaying information to the user, e.g., a cathode ray tube (CRT) or liquid crystal display (LCD), a keyboard, and a pointing device such as a mouse or a trackball, by which the user can provide input to the computer. Other kinds of devices can be used to provide for use interaction. For example, feedback can be provided to the user as visual feedback, auditory feedback, or tactile feedback; and input from the user can be received in the form of speech or tactile input.

The methods and apparatus disclosed herein may be implemented in a computing system that includes a back-end component, e.g., a data server, or that includes a middleware component, e.g., an application server, or that includes a front-end component, e.g., a client computer having a graphical user interface or a Web browser, or through any combination of such back-end, middleware, or front-end components. System components may be interconnected by any form of communication network, such as a local area network (LAN), a wide area network (WAN), or the Internet.

While certain features of the described methods and apparatus have been illustrated as described herein, many modifications, substitutions, changes and equivalents will occur to those skilled in the art. All such modifications, substitutions, changes and equivalents fall within the scope of following claims.

What is claimed is:

1. A computer implemented method for date annotating a web page, the method comprising:
    receiving a web page identified by a uniform resource identifier from a web crawler;
    automatically segmenting contents of the web page, via a processor, into at least one search data fragment responsive to receiving the web page;
    searching a date map generated from the contents of the web page for a target data fragment that matches the search data fragment, wherein the date map comprises one or more data fragments taken from the web page and associates each data fragment with a date the data fragment was first published on the web page; and
    adding the search data fragment to the date map and populating the date first published for the search data fragment in the date map with the current date if the search data fragment does not match any target data fragment in the date map.

2. The computer implemented method of claim 1, further comprising removing one or more stop-words from the at least one search data fragment after segmenting the web page into the at least one search data fragment.

3. The computer implemented method of claim 1, further comprising removing punctuation from the at least one search data fragment after segmenting the web page into the at least one search data fragment.

4. The computer implemented method of claim 1, wherein searching the date map for a target data fragment that matches the search data fragment further comprises searching the date map for a target data fragment having an edit distance from the search data fragment that is less than a threshold distance.

5. The computer implemented method of claim 1, further comprising ordering the terms of the search data fragment in alphanumerical order.

6. The computer implemented method of claim 1, further comprising:
    annotating the web page with indicia to convey a publication date for the search data fragment, wherein the publication date is the current date if the search data fragment does not match a target data fragment in the date map, and the publication date is the date associated with a target data fragment in the date map if the search data fragment does match a target data fragment in the date map; and
    storing the annotated web page in a web date server.

7. A computer program product, tangibly embodied on a machine readable medium, comprising instructions that, when executed, cause one or more programmable processors of a computer system to:
    receive a web page identified by a uniform resource identifier from a web crawl crawler;
    automatically segment contents of the web page into at least one search data fragment responsive to receiving the web page;
    search a date map generated from the contents of the web page for a target data fragment that matches the search data fragment, wherein the date map comprises one or more data fragments taken from the web page and associates each data fragment with a date the data fragment was first published on the web page; and
    add the search data fragment to the date map and populate the date first published for the search data fragment in the date map with the current date if the search data fragment does not match any target data fragment in the date map.

8. The computer program product of claim 7, further comprising instructions operable to cause a programmable processor to:
    annotate the web page with indicia to convey a publication date for the search data fragment, wherein the publication date is the current date if the search data fragment does not match a target data fragment in the date map and the publication date is the date associated with a target data fragment in the date map if the search data fragment does match a target data fragment in the date map; and
    store the annotated web page in a web date server.

9. A computer implemented method for displaying a date annotated web page, the method comprising:
    receiving a web page identified by a uniform resource identifier from a web crawler;
    automatically segmenting contents of the web page, via a processor, into at least one search data fragment responsive to receiving the web page;
    searching a date map generated from the contents of the web page for a target data fragment that matches the search data fragment, wherein the date map comprises one or more data fragments taken from the web page and associates each data fragment with a date the data fragment was first published on the web page;
    determining a publication date for the search data fragment, wherein the publication date is the current date if the search data fragment does not match any target data fragment in the date map and the publication date is the date associated with a target data fragment in the date map if the search data fragment does match a target data fragment in the date map; and
    displaying the web page using indicia to convey the publication date of the search data fragment.

10. The computer implemented method of claim 9, wherein the indicia used to convey the publication date of the search data fragment comprises the font of the search data fragment.

11. The computer implemented method of claim 9, wherein the indicia used to convey the publication date of the search data fragment comprises the color of the background on which the search data fragment is displayed.

12. The computer implemented method of claim 9, further comprising removing one or more stop-words from the at least one search data fragment after segmenting the web page into the at least one search data fragment.

13. The computer implemented method of claim 9, further comprising removing punctuation from the at least one search data fragment after segmenting the web page into the at least one search data fragment.

14. The computer implemented method of claim 9, wherein searching the date map for a target data fragment that matches the search data fragment further comprises searching the date map for a target data fragment having an edit distance from the search data fragment that is less than a threshold distance.

15. The computer implemented method of claim 9, further comprising ordering the terms of the at least one search data fragment in alphanumeric order.

16. The computer implemented method of claim 9, further comprising:
   receiving an input signal conveying a search date;
   determining whether the publication date determined for the search data fragment matches the search date; and
   displaying the web page using indicia to convey the publication date of the search data fragment only when the publication date for the search data fragment matches the search date.

17. The computer implemented method of claim 16, wherein determining whether the publication date of the search data fragment matches the search date comprises determining whether the publication date of the search data fragment lies within a period that includes the search date.

18. The computer implemented method of claim 16, wherein receiving an input signal conveying a search date comprises receiving an input signal conveying a slider position on a slider bar.

19. A computer program product, embodied on a machine readable medium, comprising instructions operable to cause a programmable processor to:
   receive a web page identified by a uniform resource identifier from a web crawler;
   automatically segment contents of the web page into at least one search data fragment responsive to receiving the web page;
   search a date map generated from the contents of the web page for a target data fragment that matches the search data fragment, wherein the date map comprises one or more data fragments taken from the web page and associates each data fragment with a date the data fragment was first published on the web page;
   determine a publication date for the search data fragment, wherein the publication date is the current date if the search data fragment does not match any target data fragment in the date map and the publication date is the date associated with a target data fragment in the date map if the search data fragment does match a target data fragment in the date map; and
   display the web page using indicia to convey the publication date of the search data fragment.

20. The computer program product of claim 19, further comprising instructions operable to cause the programmable processor to:
   receive an input signal conveying a search date;
   determine whether the publication date determined for the search data fragment matches the search date; and
   display the web page using indicia to convey the publication date of the search data fragment only when the publication date for the search data fragment matches the search date.

* * * * *

UNITED STATES PATENT AND TRADEMARK OFFICE
CERTIFICATE OF CORRECTION

PATENT NO.       : 8,332,408 B1                                           Page 1 of 1
APPLICATION NO.  : 12/861279
DATED            : December 11, 2012
INVENTOR(S)      : Matthew R. Rudary It is certified that error appears in the above-identified patent and that said Letters Patent is hereby corrected as shown below:

In column 12, line 2, in claim 7, after "web" delete "crawl".

Signed and Sealed this
Nineteenth Day of February, 2013

Teresa Stanek Rea
*Acting Director of the United States Patent and Trademark Office*